(12) United States Patent
Xu

(10) Patent No.: US 12,739,703 B2
(45) Date of Patent: Sep. 15, 2026

(54) NETWORK RESOURCE SELECTION METHOD, AND TERMINAL DEVICE AND NETWORK DEVICE

(71) Applicant: GUANGDONG OPPO MOBILE TELECOMMUNICATIONS CORP., LTD., Dongguan (CN)

(72) Inventor: Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 364 days.

(21) Appl. No.: 18/335,499

(22) Filed: Jun. 15, 2023

(65) Prior Publication Data

US 2023/0337065 A1 Oct. 19, 2023

Related U.S. Application Data

(63) Continuation of application No. PCT/CN2020/137414, filed on Dec. 17, 2020.

(51) Int. Cl.
*H04W 28/16* (2009.01)
*H04L 41/16* (2022.01)
*H04W 24/02* (2009.01)

(52) U.S. Cl.
CPC ............. *H04W 28/16* (2013.01); *H04L 41/16* (2013.01); *H04W 24/02* (2013.01)

(58) Field of Classification Search
CPC ............................... H04W 8/245; H04L 41/16
See application file for complete search history.

(56) References Cited

U.S. PATENT DOCUMENTS

2019/0140913 A1 5/2019 Guim Bernat et al.
2020/0178248 A1* 6/2020 Wen ...................... H04L 1/0006
2022/0060390 A1* 2/2022 Li .......................... H04L 67/51
2022/0179560 A1* 6/2022 Liu ....................... G06F 3/0613

FOREIGN PATENT DOCUMENTS

CN 106506176 3/2017
CN 111126594 5/2020
CN 111770062 10/2020
CN 111837425 10/2020
CN 112035516 12/2020
(Continued)

OTHER PUBLICATIONS

EPO, Extended European Search Report for EP Application No. 20965579.4, Jan. 19, 2024.

(Continued)

*Primary Examiner* — Fabricio R Murillo Garcia
(74) *Attorney, Agent, or Firm* — Hodgson Russ LLP

(57) ABSTRACT

The embodiments of the present application relate to a network resource selection method, and a terminal device and a network device. The method comprises: a terminal device sending an artifact intelligence (AI) service parameter to a first network device, wherein the AI service parameter is used for selecting a corresponding AI domain resource for the terminal device. By means of the embodiments of the present application, a network resource can be divided according to an AI service, and a corresponding AI domain resource can be allocated to a terminal device.

17 Claims, 9 Drawing Sheets

(56) References Cited

FOREIGN PATENT DOCUMENTS

| | | |
|---|---|---|
| EP | 4167645 | 4/2023 |
| WO | 2020185949 | 9/2020 |

OTHER PUBLICATIONS

"3rd Generation Partnership Project; Technical Specification Group Services and System Aspects; Study on traffic characteristics and performance requirements for AI/ML model transfer in 5GS (Release 18)," 3GPP TR 22.874, Sep. 2020, v0.1.0.

AT&T, "High-Level Overview of Artificial Intelligence in RAN," 3GPP TSG-RAN WG3 Meeting #110-e, R3-206333, Nov. 2020.

WIPO, International Search Report and Written Opinion for PCT/CN2020/137414, Sep. 15, 2021.

EPO, Communication for EP Application No. 20965579.4, Mar. 6, 2026.

* cited by examiner

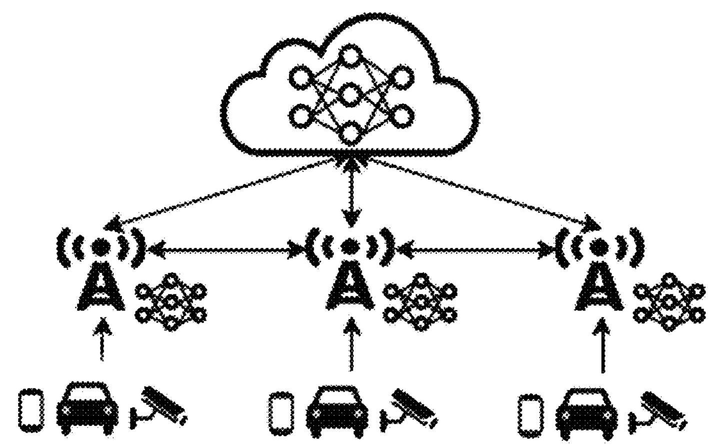
FIG.2C
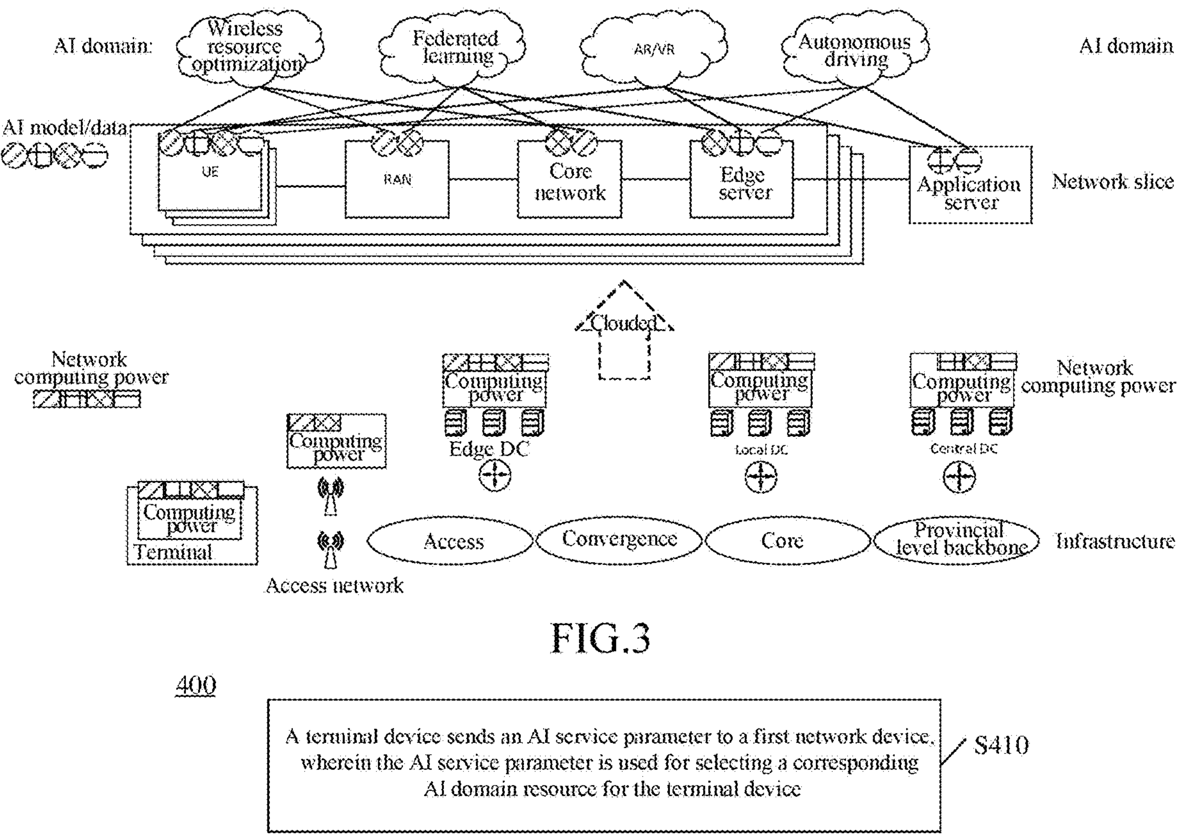
FIG.3
400
A terminal device sends an AI service parameter to a first network device, wherein the AI service parameter is used for selecting a corresponding AI domain resource for the terminal device
S410
FIG.4

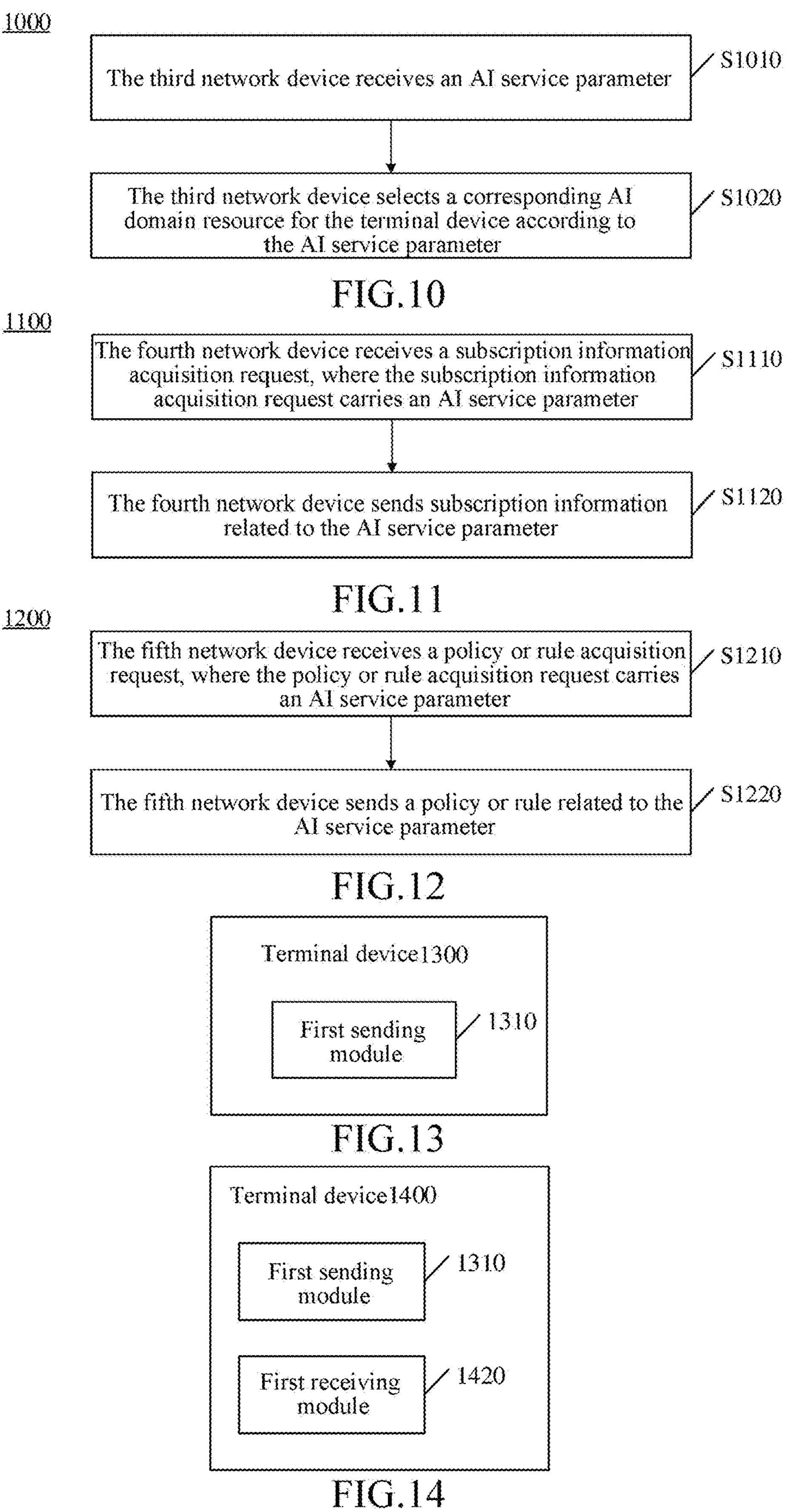
1000
The third network device receives an AI service parameter
S1010
The third network device selects a corresponding AI domain resource for the terminal device according to the AI service parameter
S1020
FIG.10
1100
The fourth network device receives a subscription information acquisition request, where the subscription information acquisition request carries an AI service parameter
S1110
The fourth network device sends subscription information related to the AI service parameter
S1120
FIG.11
1200
The fifth network device receives a policy or rule acquisition request, where the policy or rule acquisition request carries an AI service parameter
S1210
The fifth network device sends a policy or rule related to the AI service parameter
S1220
FIG.12
Terminal device1300
First sending module
1310
FIG.13
Terminal device1400
First sending module
1310
First receiving module
1420
FIG.14

NETWORK RESOURCE SELECTION METHOD, AND TERMINAL DEVICE AND NETWORK DEVICE

CROSS-REFERENCE TO RELATED APPLICATION

This application is a continuation of International Application No. PCT/CN2020/137414, filed Dec. 17, 2020, the entire disclosure of which is incorporated herein by reference.

TECHNICAL FIELD

The present application relates to the field of communications, and more particularly, to a network resource selection method, a terminal device, and a network device.

BACKGROUND

Artificial intelligence (AI) is the direction of future network development. Due to the arrival of artificial intelligence, future networks need to be able to support or even participate in AI. However, the current network resources cannot be divided according to AI services, and the mobile network cannot perceive or participate in AI services, and cannot fully utilize the respective advantages of the communication layer and the application layer to achieve better AI service capabilities.

SUMMARY

The embodiments of the present application propose a network resource selection method, a terminal device, and a network device, which can divide network resources according to AI services, so as to make full use of the advantages of various network resources to better realize AI service capabilities.

The embodiments of the present application propose a network resource selection method, including:

sending, by a terminal device, an artificial intelligence (AI) service parameter to a first network device, where the AI service parameter is used for selecting a corresponding AI domain resource for the terminal device.

The embodiments of the present application also propose a network resource selection method, including:

receiving, by a first network device, an AI service parameter from a terminal device;

selecting, by the first network device, a corresponding AI domain resource for the terminal device according to the AI service parameter.

The embodiments of the present application also propose a network resource selection method, including:

receiving, by a second network device, an AI service parameter;

selecting, by the second network device, a corresponding AI domain resource for a terminal device according to the AI service parameter.

The embodiments of the present application also propose a network resource selection method, including:

receiving, by a third network device, an AI service parameter;

selecting, by the third network device, a corresponding AI domain resource for a terminal device according to the AI service parameter.

The embodiments of the present application also propose a method for sending subscription information, including:

receiving, by a fourth network device, a subscription information acquisition request, where the subscription information acquisition request carries an AI service parameter;

sending, by the fourth network device, subscription information related to the AI service parameter.

The embodiments of the present application also propose a method for sending a policy or rule, including:

receiving, by a fifth network device, a policy or rule acquisition request, where the policy or rule acquisition request carries an AI service parameter;

sending, by the fifth network device, a policy or rule related to the AI service parameter.

The embodiments of the present application also propose a method for dividing a network resource, including:

dividing a network resource into a plurality of AI domain resources, where each of the AI domain resources includes a resource for use by at least one AI service.

The embodiments of the present application also propose a terminal device, including:

a first sending module, configured to send an artificial intelligence (AI) service parameter to a first network device, where the AI service parameter is used for selecting a corresponding AI domain resource for the terminal device.

The embodiments of the present application also propose a network device, including:

a second receiving module, configured to receive an AI service parameter from a terminal device;

a first selection module, configured to select a corresponding AI domain resource for the terminal device according to the AI service parameter.

The embodiments of the present application also propose a network device, including:

a third receiving module, configured to receive an AI service parameter;

a second selection module, configured to select a corresponding AI domain resource for a terminal device according to the AI service parameter.

The embodiments of the present application also propose a network device, including:

a fourth receiving module, configured to receive an AI service parameter;

a third selection module, configured to select a corresponding AI domain resource for a terminal device according to the AI service parameter.

The embodiments of the present application also propose a network device, including:

a fifth receiving module, configured to receive a subscription information acquisition request, where the subscription information acquisition request carries an AI service parameter;

a second sending module, configured to send subscription information related to the AI service parameter.

The embodiments of the present application also propose a network device, including:

a sixth receiving module, configured to receive a policy or rule acquisition request, where the policy or rule acquisition request carries an AI service parameter;

a third sending module, configured to send a policy or rule related to the AI service parameter.

The embodiments of the present application also propose an apparatus for dividing a network resource, including:

a division module, configured to divide a network resource into a plurality of AI domain resources, where each of the AI domain resources includes a resource for use by at least one AI service.

In the embodiments of the present application, the network resource is divided into a plurality of AI domain resources according to the AI services, and the terminal device sends the AI service parameter to the network device, so that the corresponding AI domain resource can be selected for the terminal device.

BRIEF DESCRIPTION OF THE DRAWINGS

FIG. 2C is a schematic diagram of a hybrid big data analysis scenario;

FIG. 3 is a schematic diagram of a network resource division manner according to an embodiment of the present application;

FIG. 4 is an implementation flowchart of a network resource selection method 400 according to an embodiment of the present application;

FIG. 10 is a flowchart of implementation of a network resource selection method 1000 according to an embodiment of the present application;

FIG. 11 is a flowchart of implementation of a method 1100 for sending subscription information according to an embodiment of the present application;

FIG. 12 is a flowchart of implementation of a method 1200 for sending a policy or rule according to an embodiment of the present application;

FIG. 13 is a schematic structural diagram of a terminal device 1300 according to an embodiment of the present application;

FIG. 14 is a schematic structural diagram of a terminal device 1400 according to an embodiment of the present application;

DETAILED DESCRIPTION

Figure 1:
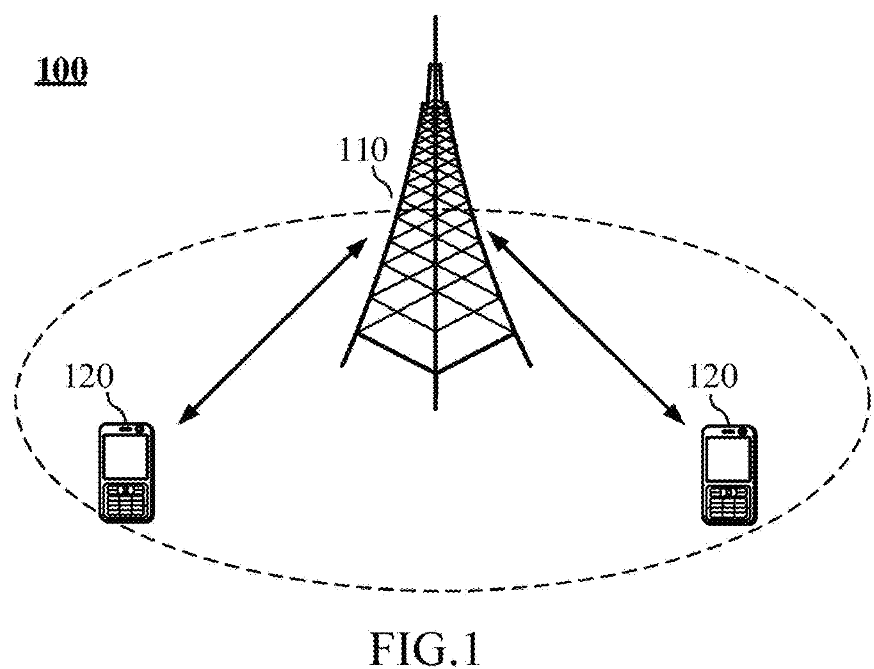
FIG. 1 is a schematic diagram of an application scenario of an embodiment of the present application.

The technical solutions in the embodiments of the present application will be described below with reference to the accompanying drawings in the embodiments of the present application.

It should be noted that the terms "first" and "second" in the description and claims of the embodiments of the present application and the above drawings are used to distinguish similar objects, and are not necessarily used to describe a specific order or sequence. Meanwhile, the objects described by "first" and "second" may be the same or different.

The technical solutions of the embodiments of the present application can be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), the next communication (5th-Generation, 5G) system or other communication systems, etc.

Generally speaking, traditional communication systems support a limited number of connections, which are easy to be implemented. However, with the development of communication technology, mobile communication systems will not only support traditional communication, but also support, for example, Device to Device (D2D) communication, Machine to Machine (M2M) communication, Machine Type Communication (MTC), and Vehicle to Vehicle (V2V) communication, etc., and the embodiments of the present application can also be applied to these communications system.

Optionally, the communication system in the embodiments of the present application may be applied to a Carrier Aggregation (CA) scenario, a Dual Connectivity (DC) scenario, or a Standalone (SA) network distribution scenario.

The embodiments of the present application do not limit the applied spectrum. For example, the embodiments of the present application can be applied to the licensed spectrum, and can also be applied to the unlicensed spectrum.

The embodiments of the present application describe various embodiments in conjunction with the network device and terminal device, where the terminal device may also be referred to as User Equipment (UE), an access terminal, a subscriber unit, a subscriber station, a mobile station, a mobile, a remote station, a remote terminal, a mobile device, a user terminal, a terminal, a wireless communication device, a user agent or a user apparatus, etc. The terminal device may be a station (STATION, ST) in the WLAN, may be a cellular phone, a cordless phone, a Session Initiation Protocol (SIP) phone, a Wireless Local Loop (WLL) station, a Personal Digital Assistant (PDA) device, a handheld device with wireless communication capabilities, a computing device or other processing devices connected to wireless modems, an in-vehicle device, a wearable device, and a next-generation communication system, such as a terminal device in NR networks or a terminal device in the future evolved Public Land Mobile Network (PLMN) network, etc.

As an example and not a limitation, in the embodiments of the present application, the terminal device may also be a wearable device. The wearable device may also be called a wearable smart device, which is a general term for wearable devices which are developed by intelligently designing daily wear by applying wearable technology, such as glasses, gloves, watches, clothing and shoes. The wearable device is a portable device that is worn directly on the body, or integrated into the user's clothing or accessories. The wearable device is not only a hardware device, but also achieves powerful functions through software support, data interaction, and cloud interaction. Generalized wearable smart devices include full-featured and large-sized devices that can achieve complete or partial functions without relying on smartphones, such as smart watches or smart glasses, and devices that focus only on a certain type of application function and need to be used in conjunction with other devices (e.g., smartphones), such as various types of smart bracelets and smart jewelry for physical sign monitoring.

The network device may be a device for communicating with a mobile device, and the network device may be an Access Point (AP) in WLAN, or a base station (Base Transceiver Station, BTS) in GSM or CDMA, it may also be a base station (NodeB, NB) in WCDMA, it may also be an evolutional base station (Evolutional Node B, eNB or eNodeB) in LTE, or a relay station or access point, or an in-vehicle device, a wearable device and a network device (gNB) in the NR network or a network device in a future evolutional PLMN network, etc.

In the embodiments of the present application, the network device provides services for a cell, and the terminal device communicates with the network device through transmission resources (for example, frequency domain resources, or spectrum resources) used by the cell, and the cell may be a cell corresponding to the network device (for example, the base station), the cell may belong to the macro base station, or it may belong to the base station corresponding to the Small cell. The Small cell here may include a Metro cell, a Micro cell, a Pico cell, a Femto cell, etc. These Small cell have the characteristics of small coverage and low transmission power, and are suitable for providing high-speed data transmission services.

FIG. 1 exemplarily shows one network device 110 and two terminal devices 120. Optionally, the wireless communication system 100 may include a plurality of network devices 110, and the coverage of each network device 110 may include other numbers of the terminal device 120, which is not limited in the embodiments of the present application. The embodiments of the present application may be applied to one terminal device 120 and one network device 110, and may also be applied to one terminal device 120 and another terminal device 120.

Optionally, the wireless communication system 100 may further include other network entities such as a Mobility Management Entity (MME), an Access and Mobility Management Function (AMF), which is not limited by the embodiments of the present disclosure.

It should be understood that the terms "system" and "network" are often used interchangeably herein. The term "and/or" in the present disclosure is only an association relationship for describing the associated objects, indicating that there may be three kinds of relationships. For example, A and/or B may mean the following three cases: A exists alone, A and B exist at the same time, and B exists alone. In addition, the character "/" in the present disclosure generally indicates that the related objects have an "or" relationship.

It should be understood that the "indication" mentioned in the embodiments of the present application may be a direct indication, or an indirect indication, or may represent an associated relationship. For example, A indicating B may represent that A directly indicates B, for example, B can be obtained through A; or may represent that A indicates B indirectly, for example, A indicates C, and B can be obtained through C; or may represent that there is an associated relationship between A and B.

In the description of the embodiments of the present application, the term "corresponding" may represent that there is a direct or indirect corresponding relationship between two things, or may represent that there is an associated relationship between the two things, or may represent relationships of indicating and being indicated, configuring and being configured, etc.

In order to facilitate the understanding of the technical solutions of the embodiments of the present application, the related technologies of the embodiments of the present application are described below. The following related technologies can be arbitrarily combined with the technical solutions of the embodiments of the present application as optional solutions, which all belong to the protection scope of the embodiments of the present application.

AI/Machine Learning (ML) (which may also be known as big data analysis) is the future direction of network development and can be used for optimization of communication systems, such as optimization of terminal configuration parameters, optimization of Policy Control and Charging (PCC)/Quality of Service (QoS) parameter, etc. In order to achieve this purpose, network elements and functions related to big data analysis need to be introduced into communication networks (such as mobile communication networks), such as Network Data Analytics Function (NWDAF) network elements for collecting, analyzing and forming valuable parameter optimization method.

In order to improve the effect and user experience of big data analysis, a multi-level AI/ML approach can be considered, that is, the network elements on the network side and the terminal(s) divide the labor for big data analysis.

Figure 2A:
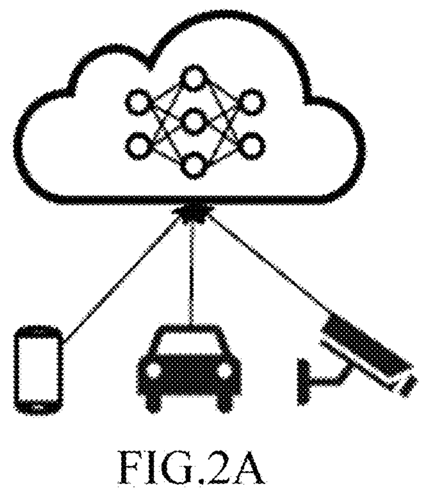
FIG. 2A is a schematic diagram of a centralized big data analysis scenario.
Figure 2B:
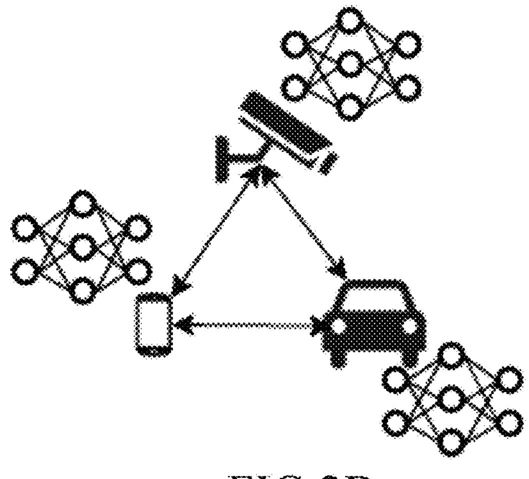
FIG. 2B is a schematic diagram of a fully distributed big data analysis scenario.

FIG. 2A is a schematic diagram of a centralized big data analysis scenario, that is, after all terminals report the required data, the big data analysis work is all performed on the network server. FIG. 2B is a schematic diagram of a fully distributed big data analysis scenario, that is, different terminals perform local analysis on the collected data. FIG. 2C is a schematic diagram of a hybrid big data analysis scenario, that is, after the terminal performs a part of the analysis on the collected data locally, the result is sent to the network server, and the network server performs further calculation and analysis. In addition, as shown in FIG. 2B and FIG. 2C, in the fully distributed and hybrid big data analysis scenarios, data interaction between the terminal devices may also be introduced to complete big data analysis or result sharing.

For example, the big data analysis work can be distributed and executed on the terminal device, an edge server, and a cloud server, or can only be executed on one or two of them. Therefore, the terminal devices may be allocated with different AI/ML models and computing workloads according to their needs, and complete the calculations within the required time and successfully send them to the network server.

Current network resources cannot be classified according to AI services, including communication resources, computing resources, and storage resources. The mobile network neither perceives nor participates in AI services, and cannot fully utilize the respective advantages of the communication layer and the application layer to achieve better AI service capabilities.

The embodiments of the present application propose a method for dividing a network resource, which can divide the network resource according to AI services. Specifically, in the embodiments of the present application, the network resource may be divided into a plurality of AI domain resources, and each AI domain resource includes a resource for use by at least one AI service. Among them, the AI service may be a business or service provided based on a specific condition, or a specific business or service provided by one or some companies. For example, different AI technology processing solutions are provided based on different users, scenarios, positions, time and other factors, and each AI technology processing solution can correspond to one AI service.

FIG. 3 is a schematic diagram of a network resource division manner according to an embodiment of the present application. As shown in FIG. 3, the AI domain proposed in the embodiments of the present application may refer to a network resource used for a specific AI service in the network, and the network resource may refer to a specific one or more servers (or network elements), or a specific resource in the server.

As shown in FIG. 3, in the embodiments of the present application, corresponding resources may be divided on different network elements, and the resources divided on individual network elements are combined to support one AI domain. For example, in the "Radio Resource Optimization" AI domain in FIG. 3, in FIG. 3, the corresponding network resources are divided in the UE, RAN and core network respectively, and a part of computing power resources and data resources are divided in the terminal, edge Data Center (DC) and Local DC, and these divided resources together form the "Radio Resource Optimization" AI domain in FIG. 3.

It can be seen that the AI domain proposed in the embodiments of the present application has multiple resources that a single network does not have, and can provide an optimal strategy for accurate AI model allocation, network resource scheduling, data sharing, and the like. In the AI domain, each node does its best to provide data, AI model management, computing power, communication capabilities, etc.

In the embodiments of the present application, the AI domain resource in one AI domain may include at least one of an AI model, a network computing power, a communication resource, a communication resource or data. As shown in FIG. 3, these resources may all be pooled resources that can be shared within one AI domain. The communication resource may include a network resource, such as an access network resource, a core network resource, such as a base station, an Access and Mobility Management Function (AMF), a Session Management Function (SMF), a User Plane Function (UPF) and other network devices.

In some implementations, the AI domain resource is distributed in at least one of the terminal device, the access network device, the core network device, or the application server. As can be seen from FIG. 3, the network elements participating in the AI domain include one or more of terminals, base stations, core network elements, and application servers, and the AI domain may be planned across multiple network slices.

In some implementations, the AI domain may be divided according to at least one of service, position, user, and third-party customization. For example, the AI domain may be divided according to service, and may be further subdivided according to dimensions such as position, user, and third-party customization.

For example, when a terminal reaches a specific position, it needs the support of Augmented Reality (AR)/Virtual Reality (VR) services, then the decision point in the AI domain can determine the most suitable AI model, and call the corresponding storage module to send the AI model to the terminal. Optionally, the decision point for the terminal to decide the most suitable AI model may be determined by the characteristics of the terminal, such as the position of the terminal, the user preference, the quantity of electricity of the terminal, the computing power, the service requirement, and so on. That is to say, the decision point of the AI domain may be matched with the most suitable AI model according to the historical data and training results, combined with the characteristics of the terminal.

As shown in FIG. 3, in the case that the network resource is divided into a plurality of AI domains according to the AI services, when a terminal device (UE) joins different AI domains, its corresponding network elements may be different. Therefore, the mobile network may select appropriate network resources for the UE according to the AI service requested, selected or allowed by the UE.

FIG. 4 is an implementation flowchart of a network resource selection method 400 according to an embodiment of the present application, including the following steps.

In S410: the terminal device sends an AI service parameter to a first network device, where the AI service parameter is used to select a corresponding AI domain resource for the terminal device.

Optionally, the above AI service parameter includes: an AI service parameter corresponding to an AI service requested, selected or allowed by the terminal device.

In the embodiments of the present application, the above AI service parameter may also be referred to as an AI domain parameter, an AI business parameter, an AI parameter, or other similar names. The AI service parameter corresponds to the AI domain, and the AI domain resource in each AI domain includes a resource for use by at least one AI service. Optionally, the above-mentioned AI domain resource includes at least one of an AI model, a network computing power, a communication resource, or data, and these resources may be pooled resources and may be shared in one AI domain. Optionally, the AI domain resource is distributed in at least one of the terminal device, the access network device, the core network device or the application server.

In some implementations, the above-mentioned first network device includes a base station, the base station broadcasts the AI domain or AI service allowed or supported by the network to which the base station belongs, and the terminal device determines whether to reside in the cell where the base station is located and/or initiate an RRC connection to the base station according to the message broadcasted by the base station and the AI service selected by itself.

Correspondingly, in some implementations, the above step S410 includes:

- the terminal device receiving an AI service parameter allowed or supported by the first network, where the AI service parameter allowed or supported by the first network corresponds to an AI service allowed or supported by the first network;
- the terminal device sending the AI service parameter to the first network device according to the AI service allowed or supported by the first network and an AI service required by the terminal device.

The above-mentioned first network may include at least one of a terminal, a base station, a core network, or an application server. The above-mentioned first network device may be a base station in the first network.

In some implementations, the above-mentioned terminal device sending the AI service parameter to the first network device may refer to the terminal device establishing a data connection with the first network using the AI service parameter allowed or supported in the first network.

Optionally, the above method may also include:

the terminal device receiving an allowed AI service parameter, where the allowed AI service parameter corresponds to an AI domain resource provided for the terminal device. For example, the allowed AI service parameter may be sent by the AMF to the terminal device. Specifically, after receiving the AI service parameter, the AMF may determine whether the terminal device is allowed to register and/or which AI services are allowed according to the AI service parameter, and feeds back the allowed AI service parameter to the terminal device.

The terminal device may carry the above AI service parameter in the case of initiating an AS layer RRC connection establishment and/or a NAS layer registration request.

For example, the terminal device sending the AI service parameter to the first network device in the above step S410, includes:

- the terminal device sending a registration request message to the first network device, where the registration request message carries the AI service parameter, such as the AI service parameter requested by the terminal device; or,
- the terminal device sending a session establishment/modification request message to the first network device, where the session establishment/modification request message carries the AI service parameter, such as the AI service parameter allowed by the terminal device, for establishing a PDU session; or,
- the terminal device sending an AS layer message to the first network device, where the AS layer message carries the AI service parameter, such as the AI service parameter requested or allowed by the terminal device.

The above AI service parameter is used for selecting the corresponding AI domain resource for the terminal device. For example, when the base station receives the AI service parameter, it may select the corresponding core network element for the terminal device according to the parameter; when the AMF receives the AI service parameter, it may select a suitable SMF for the terminal device according to the parameter; when the SMF receives the AI service parameter, it may select the appropriate UPF or mobile gateway for the terminal device according to the parameter. The above-mentioned process of selecting the network element based on the AI service parameter may occur in a registration management process and/or a session management process.

Referring to the accompanying drawings, examples of implementations of the network resource selection according to the AI service parameter in the registration management process and the session management process are respectively introduced.

First Embodiment

This embodiment relates to an implementation of using the AI service parameter to allocate the network resources in the process of registration of the terminal device. The AI service parameter may refer to an AI service parameter corresponding to one or more AI services (such as an AR service, a VR service in a certain scenario, and an autonomous driving service of a certain company) requested, selected or allowed by the terminal device.

Figure 5:
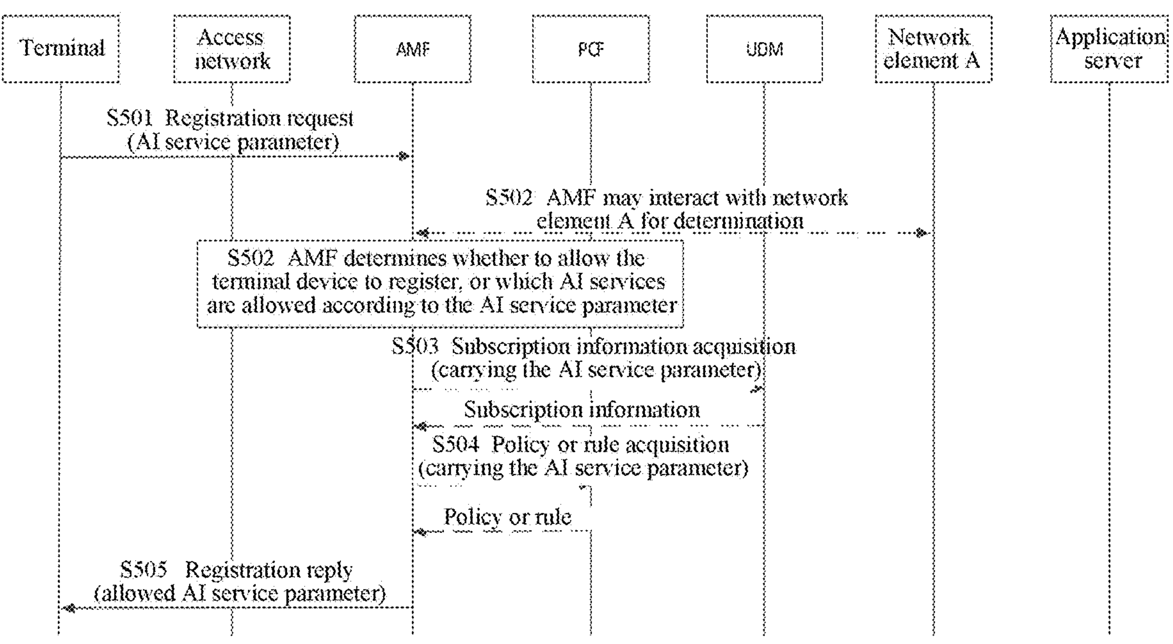
FIG. 5 is a flowchart of implementation of a first embodiment of the present application.

FIG. 5 is a flowchart of the implementation of the first embodiment of the present application. As shown in FIG. 5, this embodiment includes the following steps.

In S501: the terminal device sends a registration request to the AMF through an access network, where the registration request carries an AI service parameter used by the terminal device, such as an AI service parameter requested by the terminal device.

In S502: the AMF determines, according to the AI service parameter requested by the terminal device, whether to allow the terminal device to register, and/or which AI services (or AI services provided for the terminal device) are allowed. Specifically, the AMF may determine according to the preconfigured corresponding relationship information between the terminal device and the AI service; or, the AMF may interact with other network element (such as the network element A in FIG. 5), and determines according to the corresponding relationship information between the terminal device and the AI service stored in the other network element. The other network element may be an existing network element in the communication system, or may be a newly added network element.

In S503: the AMF sends a subscription information acquisition request to a Unified Data Manager (UDM) platform, the subscription information acquisition request may carry the AI service parameter requested by the terminal device, or carry the allowed AI service parameter, and the allowed AI service parameter corresponds to the allowed AI service (or AI service provided for the terminal device) determined by the AMF in step S502. The UDM generates subscription information corresponding to the AI service parameter, and returns the subscription information to the AMF.

In S504: the AMF sends a policy or rule acquisition request to a Policy Control Function (PCF), and the policy or rule acquisition request may carry the AI service parameter requested by the terminal device, or carry the allowed AI service parameter. The allowed AI service parameter corresponds to the allowed AI service (or AI service provided for the terminal device) determined by the AMF in step S502. The PCF generates a policy or rule corresponding to the AI service parameter, and returns the policy or rule to the AMF.

In S505: the AMF sends a registration reply message to the terminal device, where the registration reply message may carry the AI service parameter corresponding to the allowed AI service (or AI service provided for the terminal device) determined in step S502.

It should be noted that, the AI service parameter requested by the terminal device in the above step S501 and the allowed AI service parameter fed back in the step S505 may have a relationship of including and being included, or may not have an inclusion relationship. For example, the allowed AI service parameter is one or more of the AI service parameters requested by the terminal device, or the allowed AI service parameter does not belong to the AI service parameter requested by the terminal device.

Second Embodiment

This embodiment relates to an implementation of using the AI service parameter to allocate the network resource in a session management process. Since the application server may also participate in the AI domain, the selection of the mobile gateway (such as SMF and/or UPF) is very important, and it is necessary to select a gateway closest to the application server in the AI domain, which is also the key content to be introduced in this embodiment.

Figure 6:
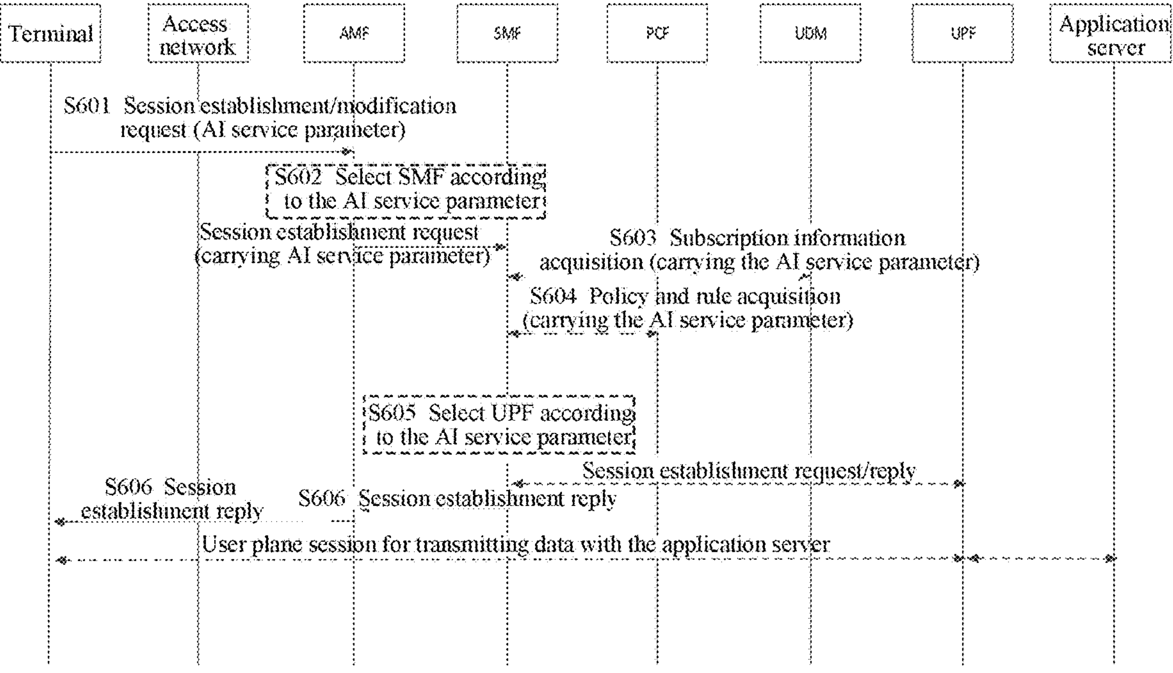
FIG. 6 is a flowchart of implementation of a second embodiment of the present application.

FIG. 6 is a flowchart of the implementation of the second embodiment of the present application. As shown in FIG. 6, this embodiment includes the following steps.

In S601: the terminal device sends a registration request to the AMF through the access network, where the registration request carries the AI service parameter used by the terminal device, such as the AI service parameter allowed by the terminal device.

In S602: the AMF selects a corresponding SMF according to the AI service parameter used by the terminal device, and initiates a session establishment request to the SMF. In the process of sending the session establishment request to the SMF, the AI service parameter used by the terminal device may be carried.

In S603: the SMF sends a subscription information acquisition request to the UDM, where the subscription information acquisition request may carry the AI service parameter used by the terminal device. The UDM generates subscription information corresponding to the AI service parameter, and returns the subscription information to the SMF.

In S604: the SMF sends a policy or rule acquisition request to the PCF, where the policy or rule acquisition request may carry the AI service parameter used by the terminal device. The PCF generates a policy or rule corresponding to the AI service parameter used by the terminal device, and returns the policy or rule to the SMF.

In S605: the SMF selects a corresponding UPF according to the AI service parameter used by the terminal device, and initiates a session establishment request to the UPF to establish a session with the UPF.

In S606: the SMF returns a session establishment reply message to the AMF, and the AMF returns a session establishment reply message to the terminal device. Afterwards, the terminal device establishes a user plane session with the application server for transmitting data with the application server.

Third Embodiment

This embodiment relates to an implementation in which the terminal device carries the AI service parameter at the AS layer. In this embodiment, the base station may carry the supported or allowed AI service parameter in the broadcast message, and the terminal device selects the AI service parameter used by itself according to the AI service parameter sent by the base station.

Figures 7, 8, 9:
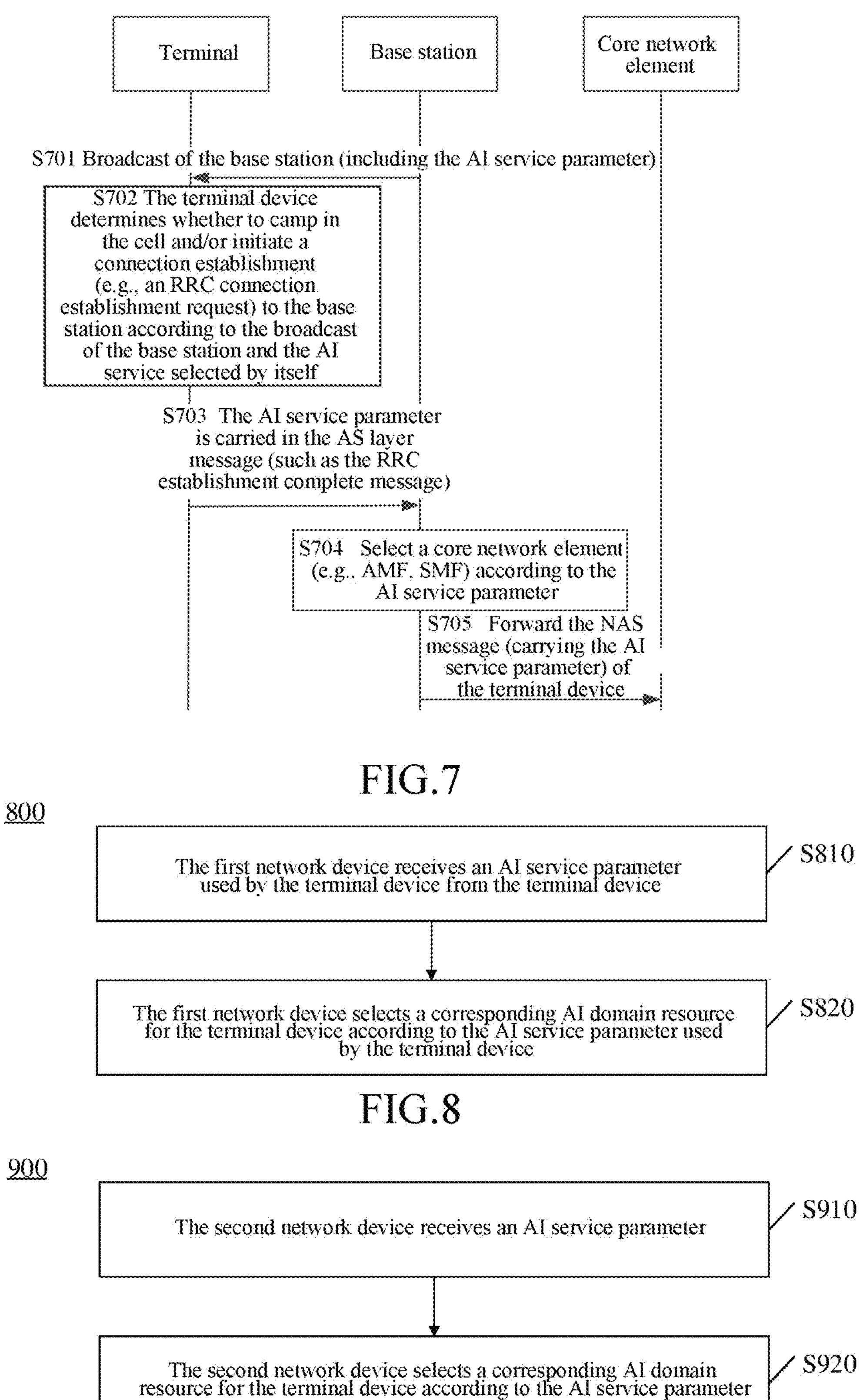
FIG. 7 is a flowchart of implementation of a third embodiment of the present application.
FIG. 8 is a flowchart of implementation of a network resource selection method 800 according to an embodiment of the present application.
FIG. 9 is a flowchart of implementation of a network resource selection method 900 according to an embodiment of the present application.

FIG. 7 is a flowchart of the implementation of the third embodiment of the present application. As shown in FIG. 7, this embodiment includes the following steps.

In S701: the base station sends a broadcast message, where the broadcast message includes an AI service parameter supported or allowed by the network to which the base station belongs, and the AI service parameter corresponds to an AI service allowed or supported by the network to which the base station belongs.

In S702: the terminal device determines, according to the broadcast of the base station and the AI service selected by itself, whether to camp in the cell where the base station is located and/or initiate a connection establishment request (e.g., an RRC connection establishment request) to the base station.

In S703: if it is selected to initiate the connection establishment request to the base station, the terminal device carries the AI service parameter used by the terminal device in the AS layer message (such as the RRC establishment complete message) sent to the base station, such as the AI service parameter request or allowed by the terminal device. The AI service parameter requested or allowed by the terminal device corresponds to the AI service requested or allowed by the terminal device.

In S704: the base station selects a core network element (e.g., AMF, SMF) corresponding to the AI service parameter according to the AI service parameter in the AS layer message.

In S705: the base station forwards the NAS message of the terminal device to the selected core network element, where the NAS message carries the AI service parameter used by the terminal device, such as the AI service parameter requested or allowed by the terminal device.

An embodiment of the present application also proposes a method for selecting a network resource. FIG. 8 is a flowchart of implementation of a method 800 for selecting a network resource according to an embodiment of the present application, including the following steps.

In S810: the first network device receives an AI service parameter from the terminal device.

In S820: the first network device selects a corresponding AI domain resource for the terminal device according to the AI service parameter.

The above-mentioned first network device may include a base station.

Optionally, the above AI service parameter includes: an AI service parameter corresponding to an AI service requested, selected or allowed by the terminal device.

Optionally, the above-mentioned AI domain resource includes a resource for use by at least one AI service.

Optionally, the above-mentioned AI domain resource includes at least one of an AI model, a network computing power, a communication resource, or data. These resources may all be pooled resources, and may be shared within one AI domain.

Optionally, the above-mentioned AI domain resource is distributed in at least one of the terminal device, the access network device, the core network device or the application server.

Optionally, the above-mentioned first network device selecting the corresponding AI domain resource for the terminal device according to the AI service parameter, includes:

the first network device selecting a corresponding core network device for the terminal device according to the AI service parameter.

Optionally, the above method further includes:

the first network device broadcasting an AI service parameter allowed or supported by the first network, where the AI service parameter allowed or supported by the first network corresponds to the AI service allowed or supported by the first network; where the first network includes at least one of a terminal, a base station, a core network or an application server.

The first network device may be a base station device in the first network.

An embodiment of the present application also proposes a method for selecting a network resource. FIG. 9 is a flowchart of implementation of a method 900 for selecting a network resource according to an embodiment of the present application, including the following steps.

In S910: the second network device receives an AI service parameter.

In S920: the second network device selects a corresponding AI domain resource for the terminal device according to the AI service parameter.

The above-mentioned second network device may include AMF.

Optionally, the above AI service parameter includes: an AI service parameter corresponding to an AI service requested, selected or allowed by the terminal device.

Optionally, the above-mentioned AI domain resource includes a resource for use by at least one AI service.

Optionally, the above-mentioned AI domain resource includes at least one of an AI model, a network computing power, a communication resource, or data.

Optionally, the above-mentioned AI domain resource is distributed in at least one of the terminal device, the access network device, the core network device or the application server.

Optionally, the above-mentioned second network device selecting the corresponding AI domain resource for the terminal device according to the AI service parameter, includes:

- the second network device determining an AI service provided for the terminal device according to the AI service parameter and corresponding relationship information between the terminal device and the AI service;
- the second network device sending an allowed AI service parameter to the terminal device, where the allowed AI service parameter corresponds to the AI service provided for the terminal device.

Optionally, the above-mentioned second network device preconfigures the corresponding relationship information; and/or, the second network device acquires the corresponding relationship information from other network device.

Optionally, the above-mentioned second network device selects a corresponding SMF for the terminal device according to the AI service parameter.

Optionally, the above method further includes: the second network device sending a session establishment request to the corresponding SMF, where the session establishment request carries the AI service parameter.

Optionally, the above method further includes: the second network device sending a subscription information acquisition request, where the subscription information acquisition request carries the AI service parameter to acquire subscription information related to the AI service parameter.

Optionally, the above method further includes: the second network device sending a policy or rule acquisition request, where the policy or rule acquisition request carries the AI service parameter to acquire a policy or rule related to the AI service parameter.

An embodiment of the present application also proposes a method for selecting a network resource. FIG. 10 is a flowchart of implementation of a method 1000 for selecting a network resource according to an embodiment of the present application, including the following steps.

In S1010: the third network device receives an AI service parameter.

In S1020: the third network device selects a corresponding AI domain resource for the terminal device according to the AI service parameter.

The above-mentioned third network device may include SMF.

Optionally, the above-mentioned AI service parameter includes: an AI service parameter corresponding to an AI service requested, selected or allowed by the terminal device.

Optionally, the above-mentioned AI domain resource includes a resource for use by at least one AI service.

Optionally, the above-mentioned AI domain resource includes at least one of an AI model, a network computing power, a communication resource, or data. These resources may all be pooled resources, and may be shared within one AI domain.

Optionally, the above-mentioned AI domain resource is distributed in at least one of the terminal device, the access network device, the core network device or the application server.

Optionally, the above-mentioned third network device selects a corresponding UPF for the terminal device according to the AI service parameter.

Optionally, receiving the AI service parameter by the third network device includes: the third network device receiving a session establishment request, where the session establishment request carries the AI service parameter.

Optionally, the above method further includes: the third network device sending a subscription information acquisition request, where the subscription information acquisition request carries the AI service parameter, so as to acquire subscription information related to the AI service parameter.

Optionally, the above method further includes: the third network device sending a policy or rule acquisition request, where the policy or rule acquisition request carries the AI service parameter to acquire a policy or rule related to the AI service parameter.

An embodiment of the present application also proposes a method for sending subscription information. FIG. 11 is a flowchart of implementation of a method 1100 for sending subscription information according to an embodiment of the present application, including the following steps.

In S1110: the fourth network device receives a subscription information acquisition request, where the subscription information acquisition request carries an AI service parameter.

In S1120: the fourth network device sends subscription information related to the AI service parameter.

The above-mentioned fourth network device may include UDM.

Optionally, the above AI service parameter include: an AI service parameter corresponding to an AI service requested, selected or allowed by the terminal device.

An embodiment of the present application also proposes a method for sending a policy or rule. FIG. 12 is a flowchart of implementation of a method 1200 for sending a policy or rule according to an embodiment of the present application, including the following steps.

In S1210: the fifth network device receives a policy or rule acquisition request, where the policy or rule acquisition request carries an AI service parameter.

In S1220: the fifth network device sends a policy or rule related to the AI service parameter.

The above-mentioned fifth network device may include a PCF.

Optionally, the above AI service parameter includes: an AI service parameter corresponding to an AI service requested, selected or allowed by the terminal device.

An embodiment of the present application further proposes a terminal device. FIG. 13 is a schematic structural diagram of a terminal device 1300 according to an embodiment of the present application, including:

a first sending module 1310, configured to send an artificial intelligence (AI) service parameter to a first network device, where the AI service parameter is used for selecting a corresponding AI domain resource for a terminal device.

Optionally, the above-mentioned AI service parameter includes: an AI service parameter corresponding to an AI service requested, selected or allowed by the terminal device.

Optionally, the above-mentioned AI domain resource includes a resource used for at least one AI service.

Optionally, the above-mentioned AI domain resource includes at least one of an AI model, a network computing power, a communication resource, or data.

Optionally, the above-mentioned AI domain resource is distributed in at least one of the terminal device, an access network device, a core network device or an application server.

Optionally, the above-mentioned first sending module 1310 is configured to:

receive an AI service parameter allowed or supported in a first network, where the AI service parameter allowed or supported in the first network corresponds to the AI service allowed or supported in the first network; where the first network includes at least one of a terminal, a base station, a core network or an application server; send the AI service parameter to the first network device according to the AI service allowed or supported in the first network and an AI service required by the terminal device.

Optionally, the above-mentioned first sending module is configured to: establish a data connection with the first network by using the AI service parameter allowed or supported in the first network.

FIG. 14 is a schematic structural diagram of a terminal device 1400 according to an embodiment of the present application. As shown in FIG. 14, optionally, the above-mentioned terminal device may further include:

a first receiving module 1420, configured to receive an allowed AI service parameter, where the allowed AI service parameter corresponds to an AI domain resource provided for the terminal device.

Optionally, the above-mentioned first sending module 1310 is configured to:

- send a registration request message to the first network device, where the registration request message carries the AI service parameter; or,
- send a session establishment/modification request message to the first network device, where the session establishment/modification request message carries the AI service parameter; or,
- send an AS layer message to the first network device, where the AS layer message carries the AI service parameter.

It should be understood that the above and other operations and/or functions of the modules in the terminal device according to the embodiments of the present application are respectively to implement the corresponding process of the terminal device in the method 400 in FIG. 4, which are not repeated here for brevity.

Figure 15:
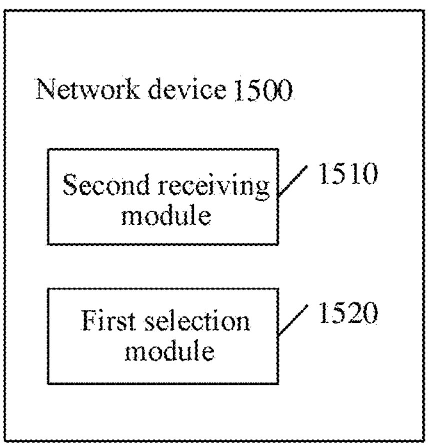
FIG. 15 is a schematic structural diagram of a network device 1500 according to an embodiment of the present application.

An embodiment of the present application also proposes a network device. FIG. 15 is a schematic structural diagram of a network device 1500 according to an embodiment of the present application, including:

- a second receiving module 1510, configured to receive an AI service parameter from the terminal device;
- a first selection module 1520, configured to select a corresponding AI domain resource for the terminal device according to the AI service parameter.

Optionally, the network device may include a base station.

Optionally, the above-mentioned AI service parameter includes: an AI service parameter corresponding to an AI service requested, selected or allowed by the terminal device.

Optionally, the above-mentioned AI domain resource includes a resource used for at least one AI service.

Optionally, the above-mentioned AI domain resource includes at least one of an AI model, a network computing power, a communication resource, or data.

Optionally, the above-mentioned AI domain resource is distributed in at least one of the terminal device, the access network device, the core network device or the application server.

Optionally, the above-mentioned first selection module 1520 is configured to select a corresponding core network device for the terminal device according to the AI service parameter.

Figure 16:
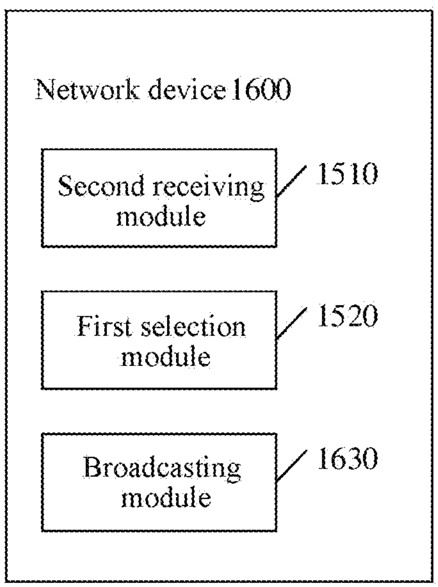
FIG. 16 is a schematic structural diagram of a network device 1600 according to an embodiment of the present application.

FIG. 16 is a schematic structural diagram of a network device 1600 according to an embodiment of the present application. As shown in FIG. 16, optionally, the above-mentioned network device may further include:

a broadcasting module 1630, configured to broadcast an AI service parameter allowed or supported by a first network to which the network device belongs, where the AI service parameter allowed or supported by the first network corresponds to the AI service allowed or supported by the first network.

It should be understood that the above and other operations and/or functions of the modules in the network device according to the embodiments of the present application are respectively to implement the corresponding processes of the network device in the method 800 in FIG. 8, which are not repeated here for brevity.

Figure 17:
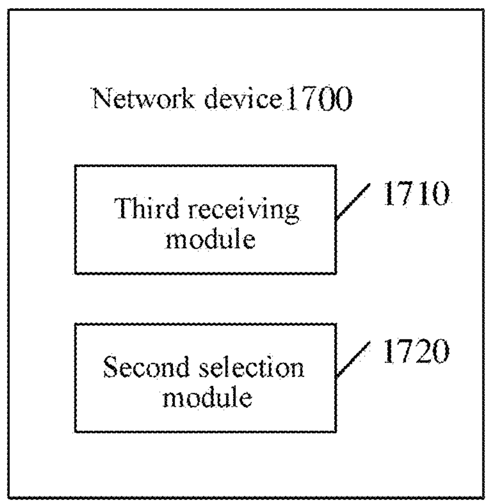
FIG. 17 is a schematic structural diagram of a network device 1700 according to an embodiment of the present application.

An embodiment of the present application further proposes a network device. FIG. 17 is a schematic structural diagram of a network device 1700 according to an embodiment of the present application, including:

- a third receiving module 1710, configured to receive an AI service parameter;
- a second selection module 1720, configured to select a corresponding AI domain resource for the terminal device according to the AI service parameter.

Optionally, the above-mentioned AI service parameter includes: an AI service parameter corresponding to an AI service requested, selected or allowed by the terminal device.

Optionally, the above-mentioned AI domain resource includes a resource used for at least one AI service.

Optionally, the above-mentioned AI domain resource includes at least one of an AI model, a network computing power, a communication resource, or data.

Optionally, the above-mentioned AI domain resource is distributed in at least one of the terminal device, the access network device, the core network device or the application server.

Optionally, the above-mentioned second selection module 1720 is configured to determine the AI service provided for the terminal device according to the AI service parameter and corresponding relationship information between the terminal device and the AI service; send the allowed AI service parameter to the terminal device, where the allowed AI service parameter corresponds to the AI service provided for the terminal device.

Optionally, the above-mentioned network device preconfigures the corresponding relationship information; and/or, the above-mentioned network device acquires the corresponding relationship information from other network device.

Optionally, the above-mentioned second selection module 1720 is configured to select the corresponding SMF for the terminal device according to the AI service parameter.

Figure 18:
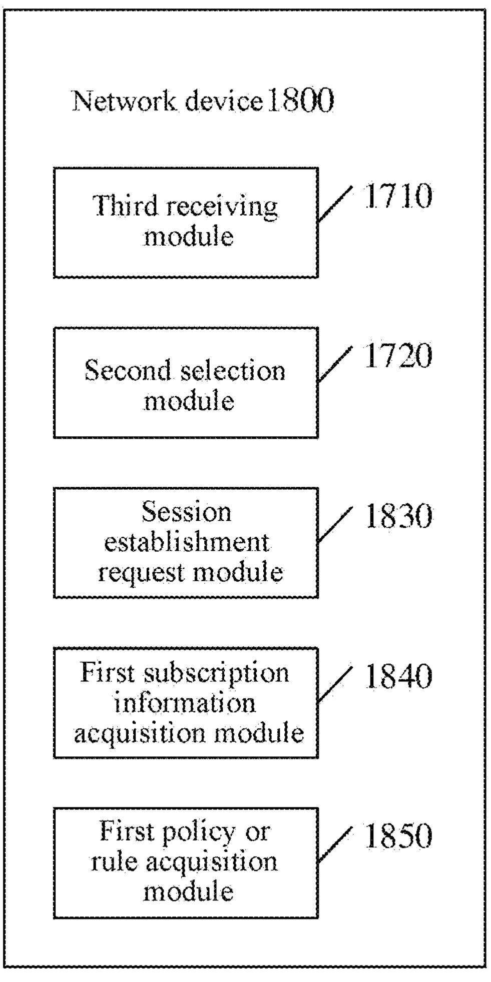
FIG. 18 is a schematic structural diagram of a network device 1800 according to an embodiment of the present application.

FIG. 18 is a schematic structural diagram of a network device 1800 according to an embodiment of the present application. As shown in FIG. 18, optionally, the above-mentioned network device may further include:

a session establishment request module 1830, configured to send a session establishment request to the corresponding SMF, where the session establishment request carries the AI service parameter.

Optionally, the network device may include AMF.

Optionally, the above network device may also include:

a first subscription information acquisition module 1840, configured to send a subscription information acquisition request, where the subscription information acquisition request carries the AI service parameter, to acquire subscription information related to the AI service parameter.

Optionally, the above network device may also include:

a first policy or rule acquisition module 1850, configured to send a policy or rule acquisition request, where the policy or rule acquisition request carries the AI service parameter to acquire a policy or rule related to the AI service parameter.

It should be understood that the above and other operations and/or functions of the modules in the network device according to the embodiments of the present application are respectively to implement the corresponding processes of the network device in the method 900 in FIG. 9, which are not repeated here for brevity.

Figure 19:
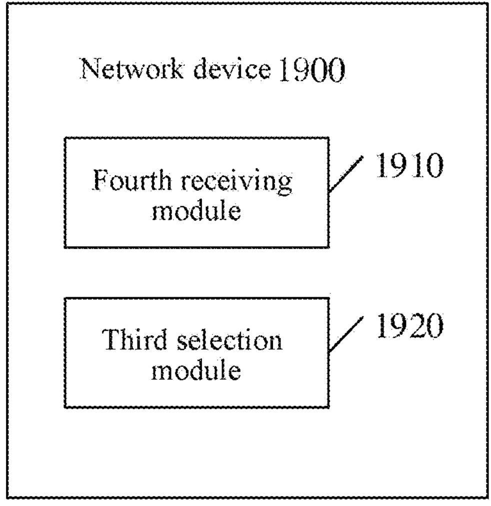
FIG. 19 is a schematic structural diagram of a network device 1900 according to an embodiment of the present application.

An embodiment of the present application further proposes a network device. FIG. 19 is a schematic structural diagram of a network device 1900 according to an embodiment of the present application, including:

- a fourth receiving module 1910, configured to receive an AI service parameter;
- a third selection module, configured to select a corresponding AI domain resource for the terminal device according to the AI service parameter.

The above-mentioned network device may include SMF.

Optionally, the above-mentioned AI service parameter includes: an AI service parameter corresponding to an AI service requested, selected or allowed by the terminal device.

Optionally, the above-mentioned AI domain resource includes a resource used for at least one AI service.

Optionally, the above-mentioned AI domain resource includes at least one of an AI model, a network computing power, a communication resource, or data.

Optionally, the above-mentioned AI domain resource is distributed in at least one of the terminal device, the access network device, the core network device or the application server.

Optionally, the above-mentioned third selection module 1920 selects a corresponding user plane function (UPF) for the terminal device according to the AI service parameter.

Optionally, the above-mentioned fourth receiving module 1910 receives a session establishment request, where the session establishment request carries the AI service parameter.

Figure 20:
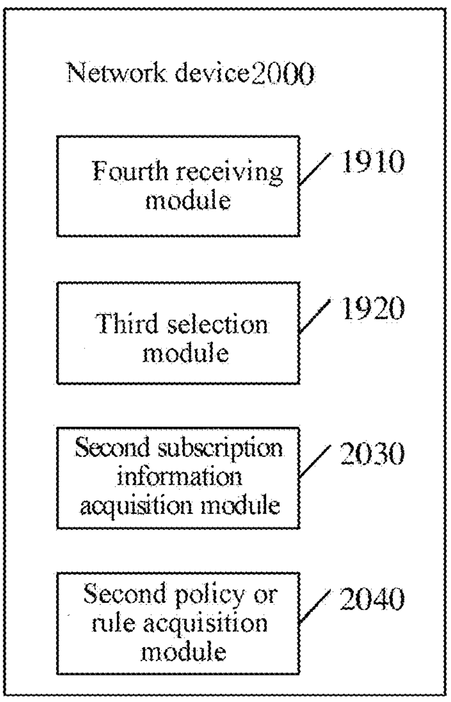
FIG. 20 is a schematic structural diagram of a network device 2000 according to an embodiment of the present application.

FIG. 20 is a schematic structural diagram of a network device 2000 according to an embodiment of the present application. As shown in FIG. 20, optionally, the above-mentioned network device may further include:

a second subscription information acquisition module 2030, configured to send a subscription information acquisition request, where the subscription information acquisition request carries the AI service parameter, to acquire subscription information related to the AI service parameter.

Optionally, the above network device may further include:

a second policy or rule acquisition module 2040, configured to send a policy or rule acquisition request, where the policy or rule acquisition request carries the AI service parameter, to acquire a policy or rule related to the AI service parameter.

It should be understood that the above and other operations and/or functions of the modules in the network device according to the embodiments of the present application are respectively to implement the corresponding processes of the network device in the method 1000 of FIG. 10, which are not repeated here for brevity.

Figure 21:
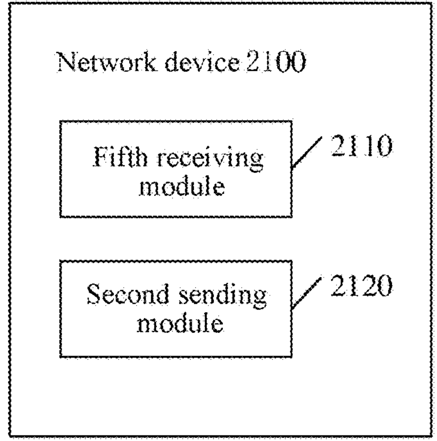
FIG. 21 is a schematic structural diagram of a network device 2100 according to an embodiment of the present application.

An embodiment of the present application further proposes a network device. FIG. 21 is a schematic structural diagram of a network device 2100 according to an embodiment of the present application, including:

- a fifth receiving module 2110, configured to receive a subscription information acquisition request, where the subscription information acquisition request carries an AI service parameter;
- a second sending module 2120, configured to send subscription information related to the AI service parameter.

The above-mentioned network device may include UDM.

Optionally, the above AI service parameter includes:

- an AI service parameter corresponding to an AI service requested, selected or allowed by the terminal device.

It should be understood that the above and other operations and/or functions of the modules in the network device according to the embodiments of the present application are respectively to implement the corresponding processes of the network device in the method 1100 of FIG. 11, which are not repeated here for brevity.

Figure 22:
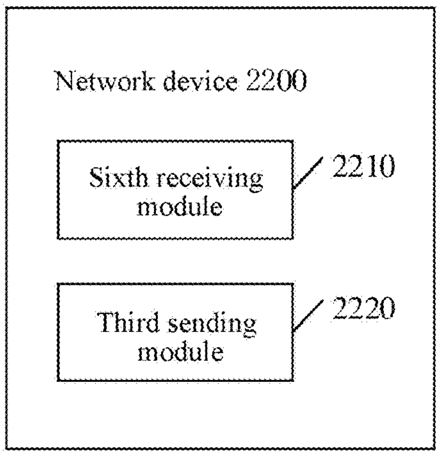
FIG. 22 is a schematic structural diagram of a network device 2200 according to an embodiment of the present application.

An embodiment of the present application also proposes a network device. FIG. 22 is a schematic structural diagram of a network device 2200 according to an embodiment of the present application, including:

- a sixth receiving module 2210, configured to receive a policy or rule acquisition request, where the policy or rule acquisition request carries an AI service parameter;
- a third sending module 2220, configured to send a policy or rule related to the AI service parameter.

The above-mentioned network device may include a PCF.

Optionally, the above AI service parameter includes: an AI service parameter corresponding to an AI service requested, selected or allowed by the terminal device.

It should be understood that the above and other operations and/or functions of the modules in the network device according to the embodiments of the present application are respectively to implement the corresponding processes of the network device in the method 1200 of FIG. 12, which are not repeated here for brevity.

The embodiment of the present application also proposes an apparatus for dividing a network resource, including:

a dividing module, configured to divide the network resource into a plurality of AI domain resource, where each AI domain resource includes a resource for use by at least one AI service.

Optionally, the above-mentioned AI domain resource includes at least one of an AI model, a network computing power, a communication resource, or data.

Optionally, the above-mentioned AI domain resource is distributed in at least one of the terminal device, the access network device, the core network device or the application server.

Optionally, the above AI domain resource is divided by at least one of service, position, user, or third-party customization.

Figure 23:
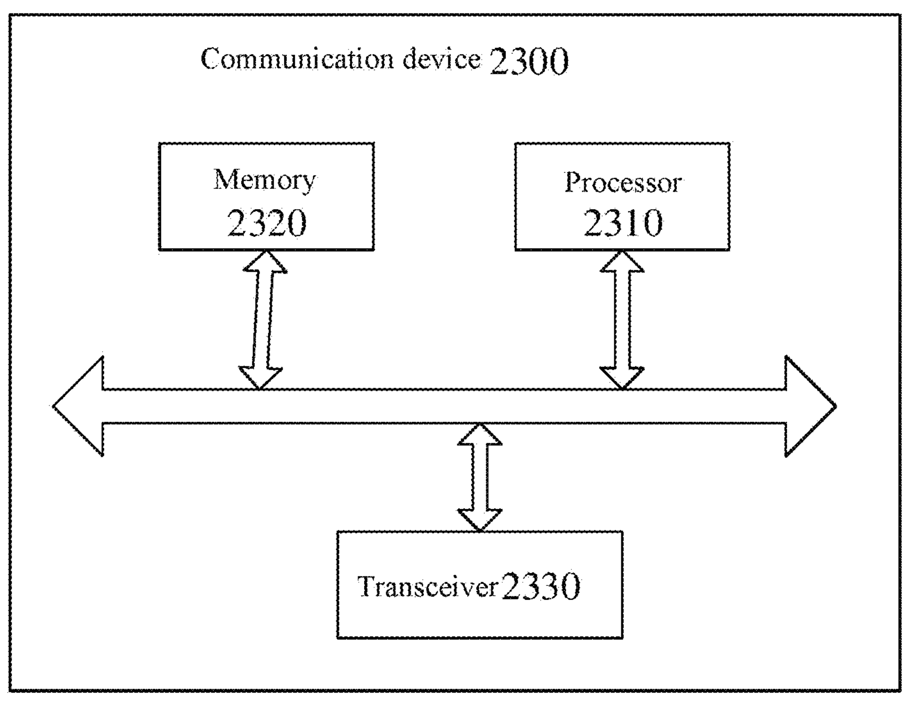
FIG. 23 is a schematic structural diagram of a communication device 2300 according to an embodiment of the present application.

FIG. 23 is a schematic structural diagram of a communication device 2300 according to an embodiment of the present application. The communication device 2300 shown in FIG. 23 includes a processor 2310, and the processor 2310 may call and run a computer program from a memory to implement the methods in the embodiments of the present application.

Optionally, as shown in FIG. 23, the communication device 2300 may further include a memory 2320. The processor 2310 may call and run a computer program from the memory 2320 to implement the methods in the embodiments of the present application.

The memory 2320 may be a separate device independent of the processor 2310, or may be integrated in the processor 2310.

Optionally, as shown in FIG. 23, the communication device 2300 may further include a transceiver 2330, and the processor 2310 may control the transceiver 2330 to communicate with other devices, specifically, may send information or data to other devices, or receive information or data sent by other devices.

The transceiver 2330 may include a transmitter and a receiver. The transceiver 2330 may further include an antenna, and the number of the antenna may be one or more.

Optionally, the communication device 2300 may be a terminal device of the embodiments of the present application, and the communication device 2300 may implement the corresponding processes implemented by the terminal device in each method of the embodiments of the present application, which is not repeated here for brevity.

Optionally, the communication device 2300 may be a network device of the embodiments of the present application, and the communication device 2300 may implement the corresponding processes implemented by the network device in each method of the embodiments of the present application, which is not repeated here for brevity.

Figure 24:
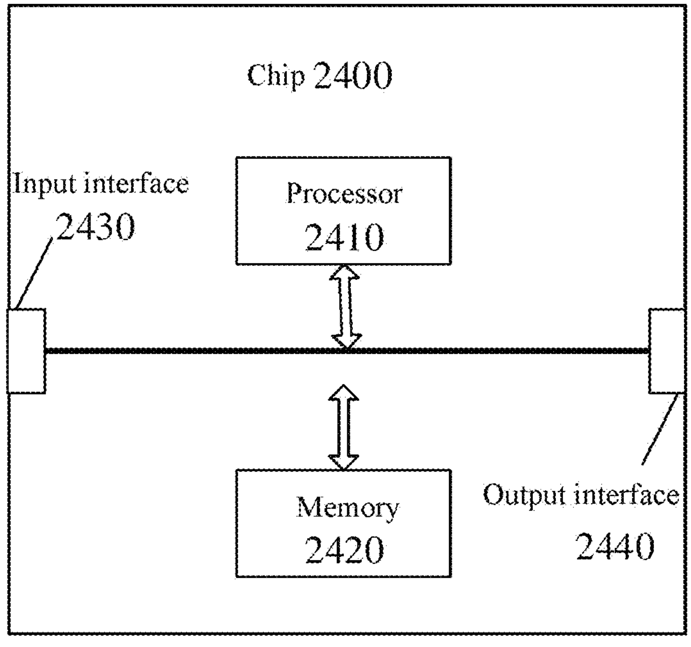
FIG. 24 is a schematic structural diagram of a chip 2400 according to an embodiment of the present application.

FIG. 24 is a schematic structural diagram of a chip 2400 according to an embodiment of the present application. The chip 2400 shown in FIG. 24 includes a processor 2410, and the processor 2410 may call and run a computer program from a memory to implement the methods in the embodiments of the present application.

Optionally, as shown in FIG. 24, the chip 2400 may further include a memory 2420. The processor 2410 may call and run a computer program from the memory 2420 to implement the methods in the embodiments of the present application.

The memory 2420 may be a separate device independent of the processor 2410, or may be integrated in the processor 2410.

Optionally, the chip 2400 may further include an input interface 2430. The processor 2410 may control the input interface 2430 to communicate with other devices or chips, and specifically, may acquire information or data sent by other devices or chips.

Optionally, the chip 2400 may further include an output interface 2440. The processor 2410 may control the output interface 2440 to communicate with other devices or chips, and specifically, may output information or data to other devices or chips.

Optionally, the chip may be applied to the terminal device in the embodiments of the present application, and the chip may implement the corresponding processes implemented by the terminal device in each method of the embodiments of the present application, which is not repeated here for brevity.

Optionally, the chip may be applied to the network device in the embodiments of the present application, and the chip may implement the corresponding processes implemented by the network device in each method of the embodiments of the present application, which is not repeated here for brevity.

It should be understood that the chip mentioned in the embodiments of the present application may also be referred to as a system level chip, a system chip, a chip system, or a system-on-chip, or the like.

The above-mentioned processor may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either volatile memory or non-volatile memory, or may include both volatile memory and non-volatile memory. The non-volatile memory may be a read-only memory (ROM), a programmable read-only memory (PROM), an erasable programmable read-only memory (EPROM), an electrically EPROM (EEPROM) or a flash memory. The volatile memory may be a random access memory (RAM).

It should be understood that the above memories are examples but not limitative description, for example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) and so on. That is, the memory in the embodiments of the present application is intended to include but not limited to these and any other suitable types of memory.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions according to the embodiments of the present application are generated in whole or in part. The computer may be a general purpose computer, a special purpose computer, a computer network, or other programmable apparatus. The computer instructions may be stored on a computer-readable storage medium or transmitted from one computer-readable storage medium to another computer-readable storage medium, for example, the computer instructions may be transmitted from a website site, computer, server or data center to another website site, computer, server or data center by wired means (e.g. a coaxial cable, an optical fiber, a Digital Subscriber Line (DSL)) or a wireless means (e.g., infrared, wireless, microwave, etc.). The computer-readable storage medium may be any available medium that can be accessed by a computer or a data storage device such as a server, data center, or the like that includes an integration of one or more available media. The available media may be a magnetic media (e.g., a floppy disk, a hard disk, a magnetic tape), an optical media (e.g., DVD), or a semiconductor media (e.g., a Solid State Disk (SSD)), and the like.

It should be understood that, in various embodiments of the present application, the size of the sequence numbers of the above-mentioned processes does not mean the sequence of execution, and the execution sequence of each process should be determined by its functions and internal logic, and should not constitute any limitation on the implementation of the embodiments of the present application.

Those skilled in the art can clearly understand that, for the convenience and brevity of description, the specific working process of the system, apparatus and unit described above may refer to the corresponding process in the foregoing method embodiments, which will not be repeated here.

The above are only specific embodiments of the present application, but the protection scope of the present application is not limited thereto. Any person skilled in the technical field can easily think of changes or replacements within the technical scope disclosed in the present application, which should be covered in the protection scope of the present application. Therefore, the protection scope of the present application shall be subject to the protection scope of claims.

What is claimed is:

1. A network resource selection method, comprising:

sending, by a terminal device, an artificial intelligence (AI) service parameter to a first network device, wherein the sent AI service parameter is used for selecting a corresponding AI domain resource for the terminal device, wherein the sent AI domain resource is obtained by dividing a network resource according to AI services into a plurality of AI domain resources, where each AI domain resource of the plurality of AI domain resources includes a respective resource for use by at least one Al service;

wherein the network resource belongs to a network serving the terminal device;

wherein the corresponding AI domain resource comprises a resource for use by at least one AI service of the AI services.

2. The method according to claim 1, wherein the AI service parameter comprises: an AI service parameter corresponding to an AI service requested, selected or allowed by the terminal device.

3. The method according to claim 1, wherein the AI domain resource is distributed in at least one of a terminal device, an access network device, a core network device, or an application server.

4. The method according to claim 1, wherein the sending, by the terminal device, the AI service parameter to the first network device, comprises:

receiving, by the terminal device, an AI service parameter allowed or supported in a first network, wherein the AI service parameter allowed or supported in the first network corresponds to an AI service allowed or supported in the first network; wherein the first network comprises at least one of a terminal, a base station, a core network, or an application server;

sending, by the terminal device, the AI service parameter to the first network device according to the AI service allowed or supported in the first network and an AI service required by the terminal device.

5. The method according to claim 4, wherein sending the AI service parameter to the first network device comprises:

establishing, by the terminal device, a data connection with the first network using the AI service parameter allowed or supported in the first network.

6. A network resource selection method, comprising:

receiving, by a first network device, an artificial intelligence (AI) service parameter from a terminal device;

selecting, by the first network device, a corresponding AI domain resource for the terminal device according to the received AI service parameter, wherein the received AI domain resource is obtained by dividing a network resource according to AI services into a plurality of AI domain resources, where each AI domain resource of the plurality of AI domain resources includes a respective resource for use by at least one AI service;

wherein the network resource belongs to a network serving the terminal device;

wherein the corresponding AI domain resource comprises a resource for use by at least one AI service of the AI services.

7. The method according to claim 6, wherein the AI service parameter comprises: an AI service parameter corresponding to an AI service requested, selected or allowed by the terminal device.

8. The method according to claim 6, wherein the AI domain resource is distributed in at least one of a terminal device, an access network device, a core network device, or an application server.

9. The method according to claim 6, wherein the selecting, by the first network device, the corresponding AI domain resource for the terminal device according to the AI service parameter, comprises:

selecting, by the first network device, a corresponding core network device for the terminal device according to the AI service parameter.

10. The method according to claim 6, further comprising:

broadcasting, by the first network device, an AI service parameter allowed or supported by a first network, wherein the AI service parameter allowed or supported by the first network corresponds to an AI service allowed or supported by the first network; wherein the first network comprises at least one of a terminal, a base station, a core network, or an application server.

11. A terminal device, comprising:

a processor and a memory, wherein the memory is used for storing a computer program, and the processor is used for calling and running the computer program stored in the memory to:

send an artificial intelligence (AI) service parameter to a first network device, wherein the sent AI service parameter is used for selecting a corresponding AI domain resource for the terminal device; wherein the sent AI domain resource is obtained by dividing a network resource according to AI services into a plurality of AI domain resources, where each AI domain resource of the plurality of AI domain resources includes a respective resource for use by at least one AI service;

wherein the network resource belongs to a network serving the terminal device;

wherein the corresponding AI domain resource comprises a resource for use by at least one AI service of the AI services.

12. The terminal device according to claim 11, wherein the AI service parameter comprises:

an AI service parameter corresponding to an AI service requested, selected or allowed by the terminal device.

13. The terminal device according to claim 11, wherein the AI domain resource is distributed in at least one of a terminal device, an access network device, a core network device, or an application server.

14. The terminal device according to claim 11, wherein the processor is further configured to:

receive an AI service parameter allowed or supported in a first network, wherein the AI service parameter allowed or supported in the first network corresponds to an AI service allowed or supported in the first network; wherein the first network comprises at least one of a terminal, a base station, a core network, or an application server;

send the AI service parameter to the first network device according to the AI service allowed or supported in the first network and an AI service required by the terminal device.

15. The terminal device according to claim 14, wherein the processor is further configured to: establish a data connection with the first network using the AI service parameter allowed or supported in the first network.

16. The terminal device according to claim 11, wherein the processor is further configured to:

receive an allowed AI service parameter, wherein the allowed AI service parameter corresponds to an AI domain resource provided for the terminal device.

17. The terminal device according to claim 11, wherein the processor is further configured to:

send a registration request message to the first network device, wherein the registration request message carries the AI service parameter; or, send a session establishment/modification request message to the first network device, wherein the session establishment/modification request message carries the AI service parameter; or, send an AS layer message to the first network device, wherein the AS layer message carries the AI service parameter.

* * * * *